United States Patent
Spybey et al.

(10) Patent No.: US 8,770,954 B2
(45) Date of Patent: Jul. 8, 2014

(54) HUMAN-POWERED IRRIGATION PUMP

(75) Inventors: Alan Spybey, Nairobi (KE); Martin J. Fisher, San Francisco, CA (US); Simon M. Mugo, Nyeri (KE); Alex M. Mucheru, Nairobi (KE); Frederick Obudho, Nairobi (KE)

(73) Assignee: KickSmart International, Inc., San Francisco, CA (US)

( * ) Notice: Subject to any disclaimer, the term of this patent is extended or adjusted under 35 U.S.C. 154(b) by 348 days.

(21) Appl. No.: 13/024,839

(22) Filed: Feb. 10, 2011

(65) Prior Publication Data

US 2011/0250080 A1 Oct. 13, 2011

Related U.S. Application Data

(60) Provisional application No. 61/303,076, filed on Feb. 10, 2010.

(51) Int. Cl.
*F04B 49/00* (2006.01)
*F04B 43/00* (2006.01)

(52) U.S. Cl.
USPC ............ 417/544; 417/523; 417/539; 417/903

(58) Field of Classification Search
USPC ............ 417/521, 533, 539, 544, 903; 482/53, 482/112, 113
See application file for complete search history.

(56) References Cited

U.S. PATENT DOCUMENTS

| 6,596 | A | 7/1849 | Thatcher |
|---|---|---|---|
| 148,809 | A | 3/1874 | Coffin |
| 149,953 | A | 4/1874 | Robaugh |
| 205,699 | A | 7/1878 | Swan |
| 339,617 | A | 4/1886 | Case |
| 372,888 | A | 11/1887 | Bean |
| 413,669 | A | 10/1889 | Horr |
| 439,992 | A * | 11/1890 | Anderson ................. 74/104 |
| 523,240 | A | 7/1894 | Rodenbaugh |
| 568,800 | A | 10/1896 | Scholl |

(Continued)

FOREIGN PATENT DOCUMENTS

| CN | 2074379 | 4/1991 |
|---|---|---|
| DE | 19511677 | 9/1996 |

(Continued)

OTHER PUBLICATIONS

"Treadle pumps for irrigation in Africa", by Melvyn Kay and Tom Brabben, Knowledge Synthesis report No. 1—Oct. 2000, Published by Food and Agriculture Organization of the United Nations, pp. 24-26.*

(Continued)

*Primary Examiner* — Peter J Bertheaud
*Assistant Examiner* — Dominick L Plakkoottam
(74) *Attorney, Agent, or Firm* — Goodwin Procter LLP

(57) ABSTRACT

A human-powered pump assembly includes a frame and a treadle pivot attached to the frame, such that the treadle pivot defines a horizontal rotational axis. The pump assembly includes a pair of treadles coupled to the treadle pivot and a rocker pivot attached to the frame, such that the rocker pivot defines a separate horizontal rotational axis. The pump assembly includes a reciprocating rocker coupled to the rocker pivot and to the pair of treadles to constrain the motion thereof, such that the rocker pivot axis is located below the treadle pivot axis.

19 Claims, 19 Drawing Sheets

(56) References Cited

U.S. PATENT DOCUMENTS

| | | | |
|---|---|---|---|
| 724,569 A | 4/1903 | Gragert | |
| 767,092 A | 8/1904 | Walker et al. | |
| 784,593 A | 3/1905 | Resor | |
| 818,522 A | 4/1906 | Cox | |
| 909,676 A | 1/1909 | Rockola | |
| 977,823 A | 12/1910 | Miller | |
| 996,882 A | 7/1911 | Reddy | |
| 1,012,917 A | 12/1911 | Rockola | |
| 1,096,463 A | 12/1913 | Schorn | |
| 1,236,479 A * | 8/1917 | Peteler | 92/20 |
| 1,301,731 A | 4/1919 | Muzzy | |
| 1,328,529 A | 1/1920 | Lillos | |
| 1,348,058 A * | 7/1920 | Service | 92/20 |
| 1,520,621 A | 12/1924 | Watkins | |
| 1,539,556 A | 5/1925 | Garber | |
| 1,600,352 A | 9/1926 | Nagy | |
| 1,721,245 A | 7/1929 | Black | |
| 1,831,379 A | 11/1931 | Creser | |
| 1,974,964 A | 9/1934 | Lyons et al. | |
| 2,074,787 A | 3/1937 | Herbst | |
| 2,371,704 A | 3/1945 | Nichols | |
| 2,633,808 A | 4/1953 | Webber | |
| 2,651,454 A | 9/1953 | Bjurstrom | |
| 2,699,152 A | 1/1955 | Dexter | |
| 2,699,153 A | 1/1955 | Dexter | |
| 2,727,467 A | 12/1955 | Dexter | |
| 3,551,012 A | 12/1970 | Sutliff et al. | |
| 3,730,651 A | 5/1973 | Ellis | |
| 4,093,403 A | 6/1978 | Schrimpf et al. | |
| 4,123,204 A | 10/1978 | Scholle | |
| 4,159,111 A * | 6/1979 | Lowth | 482/80 |
| 4,173,431 A | 11/1979 | Smith | |
| 4,178,240 A | 12/1979 | Pinkerton | |
| 4,354,595 A * | 10/1982 | Reynolds | 198/807 |
| 4,384,675 A | 5/1983 | Jacobs | |
| 4,403,919 A | 9/1983 | Stanton et al. | |
| 4,688,999 A | 8/1987 | Ames et al. | |
| 4,871,302 A | 10/1989 | Clardy et al. | |
| 5,000,441 A | 3/1991 | Wang | |
| 5,118,265 A | 6/1992 | Bearss | |
| 5,299,994 A | 4/1994 | Chen | |
| 5,346,452 A | 9/1994 | Ku | |
| 5,363,666 A | 11/1994 | Tieken | |
| 5,401,146 A * | 3/1995 | Moriya et al. | 417/423.14 |
| 5,445,505 A | 8/1995 | Hung | |
| 5,473,706 A | 12/1995 | Bacus et al. | |
| 5,564,911 A | 10/1996 | Santa | |
| 5,616,005 A | 4/1997 | Whitehead | |
| 5,634,774 A | 6/1997 | Angel et al. | |
| 5,651,302 A | 7/1997 | Mills | |
| 5,807,210 A | 9/1998 | Devlin | |
| 5,890,996 A | 4/1999 | Frame et al. | |
| 5,893,707 A | 4/1999 | Simmons | |
| 5,934,888 A | 8/1999 | Marka et al. | |
| 6,203,696 B1 | 3/2001 | Pearson | |
| 6,234,774 B1 | 5/2001 | Siviero | |
| 6,241,643 B1 | 6/2001 | Loft et al. | |
| 6,299,415 B1 | 10/2001 | Bahrton | |
| 6,341,782 B1 | 1/2002 | Etsion | |
| 6,435,843 B1 | 8/2002 | Hur | |
| 6,577,754 B2 | 6/2003 | Stone et al. | |
| 6,581,011 B1 | 6/2003 | Johnson et al. | |
| 6,611,833 B1 | 8/2003 | Johnson | |
| 6,622,612 B2 | 9/2003 | Notzon | |
| 6,712,739 B1 | 3/2004 | Chen | |
| 6,832,002 B2 | 12/2004 | Baatz et al. | |
| 6,918,857 B2 | 7/2005 | Chen | |
| 6,921,353 B2 | 7/2005 | Chuang | |
| 7,048,675 B1 | 5/2006 | Liang et al. | |
| 7,083,549 B1 | 8/2006 | Fan | |
| 7,097,593 B2 | 8/2006 | Chang | |
| 7,146,380 B2 | 12/2006 | Schaepe et al. | |
| 7,396,218 B2 | 7/2008 | Hyde et al. | |
| 7,517,306 B2 | 4/2009 | Fisher et al. | |
| 2002/0119361 A1 | 8/2002 | Herrmann | |
| 2004/0166005 A1 | 8/2004 | Hyde et al. | |
| 2005/0136509 A1 | 6/2005 | Gholap et al. | |
| 2005/0136549 A1 | 6/2005 | Gholap et al. | |
| 2006/0204375 A1 | 9/2006 | Judge | |
| 2008/0260550 A1 | 10/2008 | Fisher et al. | |
| 2008/0267800 A1 | 10/2008 | McNeil | |
| 2011/0265642 A1 | 11/2011 | Spybey et al. | |

FOREIGN PATENT DOCUMENTS

| | | |
|---|---|---|
| EP | 0304210 | 2/1989 |
| SE | 92019819 | 6/1992 |
| WO | WO-0015962 | 3/2000 |
| WO | WO-02097269 | 12/2002 |
| WO | WO-2005050022 | 6/2005 |
| WO | WO-2006042264 | 4/2006 |
| WO | WO-2006133473 | 12/2006 |
| WO | WO-2010062256 | 6/2010 |
| WO | WO-2011100430 | 8/2011 |
| WO | WO-2011140089 | 11/2011 |

OTHER PUBLICATIONS

International Preliminary Examination Report for PCT/US2002/17518 mailed Jun. 17, 2003, 8 pages.
International Search Report and Written Opinion for PCT/US2004/38130 mailed Apr. 5, 2005, 13 pages.
International Search Report and Written Opinion for PCT/US2005/36636 mailed Mar. 30, 2006, 6 pages.
International Search Report and Written Opinion for PCT/US2011/035002 mailed Feb. 9, 2012, 9 pages.
International Search Report and Written Opinion for PCT/US2011/024350 mailed Oct. 24, 2011, 8 pages.
International Preliminary Examination Report for PCT/US2011/024350 mailed Aug. 23, 2012, 5 pages.

* cited by examiner

HUMAN-POWERED IRRIGATION PUMP

PRIORITY CLAIM

This application claims priority to and the benefit of U.S. Provisional Patent Application Ser. No. 61/303,076, filed on Feb. 10, 2010, the disclosure of which is hereby incorporated herein by reference in its entirety.

TECHNICAL FIELD

The present invention relates generally to human-powered pump systems, and more specifically to human-powered foot treadle pumps that utilize a rocker to actuate a pair of pistons for irrigation.

BACKGROUND

Human-powered treadle pumps, for example, pumps used to create suction or pressure to irrigate fields, exist in many forms. One type includes a pair of treadles connected to and disposed between a rocker and pistons. Each of the treadles is directly coupled to a corresponding piston. A tensile component (e.g., a rope or a chain) links together the rocker and the treadles and/or the rocker and the pistons. The rocker facilitates alternating, reciprocating movement of the treadles and the corresponding pistons. Downward movement of one treadle drives one piston downward, while upward movement of the other treadle lifts the other piston. Lifting a piston causes a suction movement to fill a piston cylinder with fluid. Depressing a piston pumps fluid out of the cylinder for use at a higher elevation or any other location.

Many existing human-powered treadle pumps mount the rocker on a tower or vertical shaft that extends above the treadles. This arrangement, however, can create instability and inefficiency in the operation of the pump. Adding stiffness to certain components to address instability and inefficiency may cause the overall weight to increase, as well as increase cost of the pump. Moreover, a heavier pump may still be inefficient, in that power transfer between components can be diminished due to relatively high friction losses and energy required to overcome inertial effects.

SUMMARY OF THE INVENTION

Accordingly, there exists a need for a lighter, stiffer, and lower-cost human-powered treadle pump and associated method that meets these objectives, for providing a reliable way for people to transport water and liquids and make pump repairs easily, when necessary.

In one aspect, the invention relates to a human-powered pump assembly having a frame and a treadle pivot attached to the frame, such that the treadle pivot defines a horizontal rotational axis. The human-powered pump assembly includes a pair of treadles coupled to the treadle pivot and a rocker pivot attached to the frame, such that the rocker pivot defines a separate horizontal rotational axis. The human-powered pump assembly includes a reciprocating rocker coupled to the rocker pivot and to the pair of treadles to constrain the motion thereof, such that the rocker pivot axis can be located below the treadle pivot axis.

In an embodiment of the foregoing aspect, the rocker pivot can be supported by the frame on two sides of the reciprocating rocker. In another embodiment, the human-powered pump assembly also includes a pair of cylinders coupled to the frame. In yet another embodiment, the cylinders can be welded to the frame.

In still another embodiment, the human-powered pump assembly may also include a piston disposed in each of the cylinders. In another embodiment, each piston includes a connecting rod forming a channel along a longitudinal axis thereof. In another embodiment, each channel can be configured to receive an edge of the reciprocating rocker to guide movement of an associated piston. In yet another embodiment, each edge of the reciprocating rocker and an associated channel can be configured for rolling contact to maintain piston alignment in an associated cylinder. In another embodiment, the pistons can be connected by tensile members to the reciprocating rocker. In one embodiment, the tensile members may be located between the pair of treadles. In yet another embodiment, each of the tensile members can be a flexible steel cable.

In another embodiment, the human-powered pump assembly also includes a pair of valves within each cylinder. In a further embodiment, the human-powered pump assembly also includes a valve plate connected to each cylinder. In still another embodiment, each valve plate forms a pair of shaped apertures. In another embodiment, the pair of valves can be adapted to seal the pair of shaped apertures and can be configured to be installed in the valve plate via access to only one side of the valve plate. In one embodiment, the shaped aperture includes a substantially triangular portion. In yet another embodiment, each valve includes a compound seal with a replaceable hinge reinforcement element adapted to modify an opening force of the valve and to bias the valve into sealing engagement with a valve plate. In another embodiment, the replaceable hinge reinforcement element includes an elongate element. In still another embodiment, the replaceable hinge reinforcement element includes a tubular element.

In another aspect, the invention relates to a method of operating a human-powered pump, including applying a force to a first treadle to rotate the first treadle about a treadle pivot axis in a downward direction, the first treadle coupled to a second treadle by a reciprocating rocker rotating about a rocker pivot axis located below the treadle pivot axis, such that the second treadle rotates in an upward direction. The method also includes applying a downward force to the second treadle to rotate the second treadle about the treadle pivot axis in a downward direction, such that the first treadle rotates in an upward direction.

In an embodiment of the above aspect, rotation of the first treadle forces a first piston in a downward direction. In another embodiment, the first piston transfers the downward force through a first tensile member to the reciprocating rocker, causing the reciprocating rocker to rotate about the rocker pivot axis. In yet another embodiment, rotation of the reciprocating rocker provides an upward force to a second piston through a second tensile member, causing the second treadle to rotate in an upward direction. In another embodiment, each treadle can be received in a cradle of a corresponding piston and can be raised by upward movement of the corresponding piston.

BRIEF DESCRIPTION OF THE FIGURES

Other features and advantages of the present invention, as well as the invention itself, can be more fully understood from the following description of the various embodiments, when read together with the accompanying drawings, in which.

DETAILED DESCRIPTION

Figure 1A:
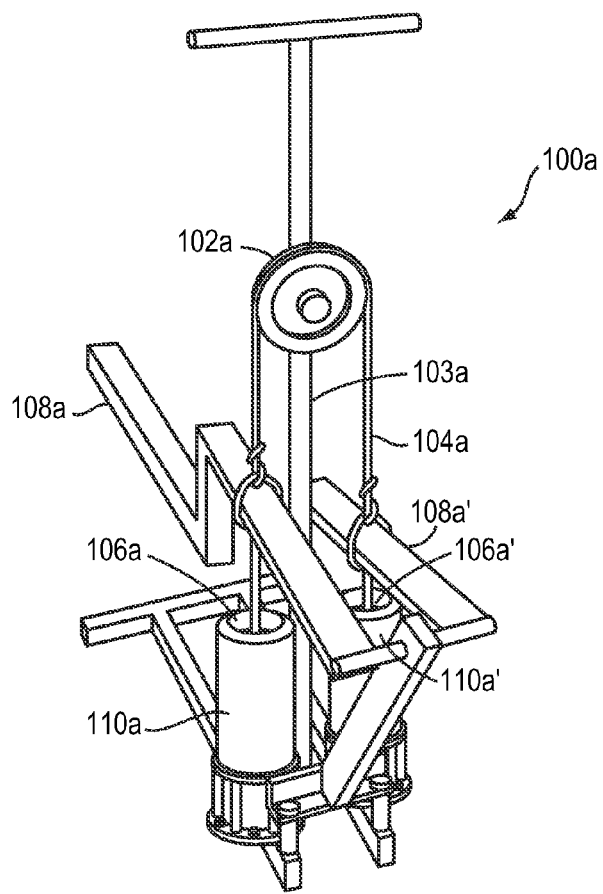
FIGS. 1A and 1B are schematic perspective views of prior art treadle pumps.
Figure 1B:
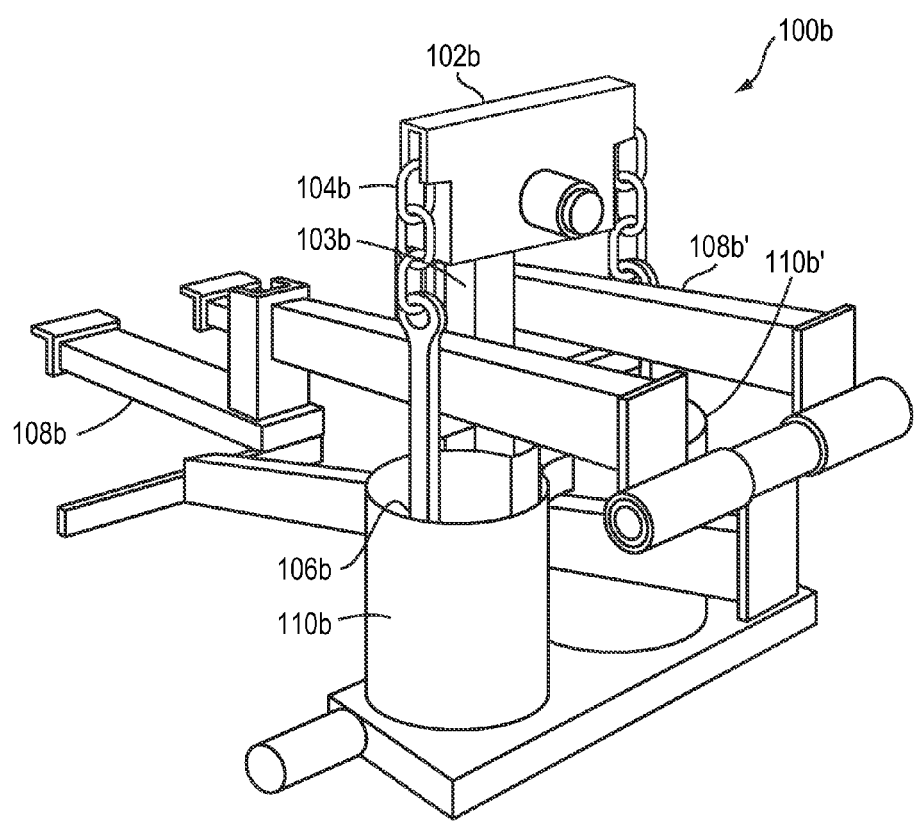
Figure 2A:
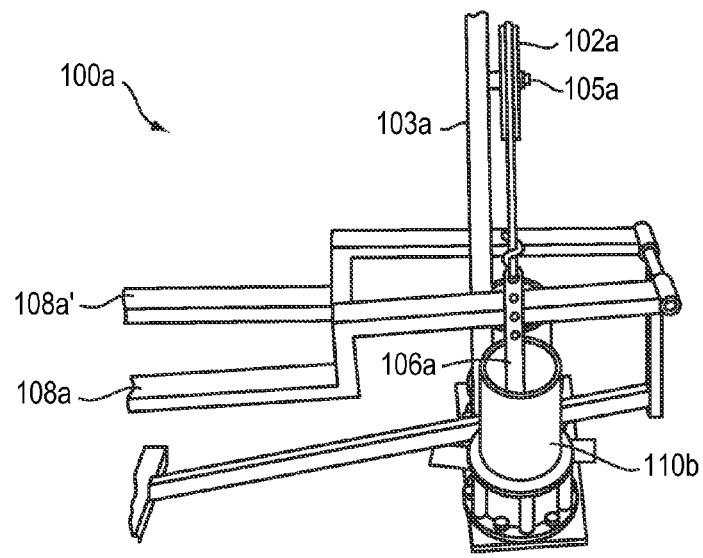
FIGS. 2A and 2B are schematic perspective views of prior art treadle pumps
Figure 2B:
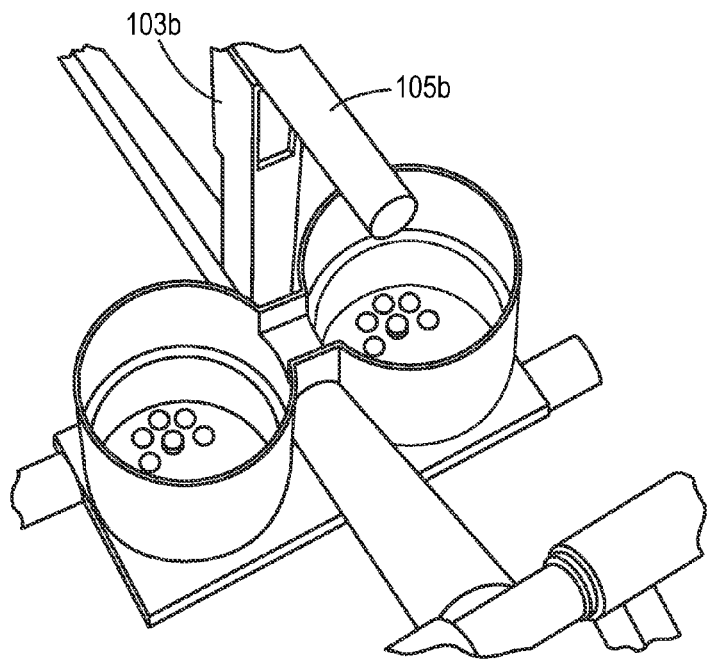

FIGS. 1A and 1B depict prior art treadle pumps 100a, 100b in which a rocker element 102 is mounted above the treadles, often on a tower 103. The tower 103 may add weight to the pump 100, and may flex in use. This is particularly the case when, as in normal practice, the rocker 102 is mounted on a cantilever 105 jutting from the tower 103, as depicted in FIGS. 2A and 2B. The tower 103 may either be allowed to flex in use, absorbing human power input that decreases the efficiency of the pump 100, or may be made sufficiently stiff, which adds weight and cost, to substantially resist major flexing. The rocker 102 may take several different forms, such as a circular wheel 102a or a generally rectangular profile 102b. Typically, as shown in FIGS. 1A and 1B, the rocker 102 supports a tensile component 104 (e.g., a rope 104a or a chain 104b) connected to a pair of pistons 106 and/or treadles 108 below it. When a user steps on a raised treadle 108, the piston 106 below the treadle 108 may be forced down, evacuating its cylinder 110 of fluid while pulling down on the rope 104a or chain 104b. The rocker 102 may then pivot and pull up on the other piston 106' and treadle 108' combination, causing a suction movement and drawing fluid into its corresponding cylinder 110'. By stepping on this now raised treadle 108', the action may be reversed and fluid may be cyclically drawn into and pumped out of the cylinders 110, 110'. Corresponding flapper valves affixed to opposite sides of a valve plate located at the bottom of each cylinder may regulate the flow into and out of the cylinders (as shown in FIG. 8E).

In several prior art treadle pumps 100, the treadle 108 is interposed between the piston 106 and the rocker 102, and the rocker 102 slides onto the cantilevered horizontal shaft 105. At the same time, the rocker 102 may be linked to the pistons 106. Delinking the different components to extract the pistons 106 from the cylinders 110 may require a significant amount of time. Handling individual pistons 106 after extraction can be difficult, since the pistons 106 may still be linked to the rocker 102. Piston cups above a piston disk (i.e., the cups that provide suction) may need to be stretched over the piston disk after detachment from cup retainers. Some of these operations may require two people working together.

Figure 3:
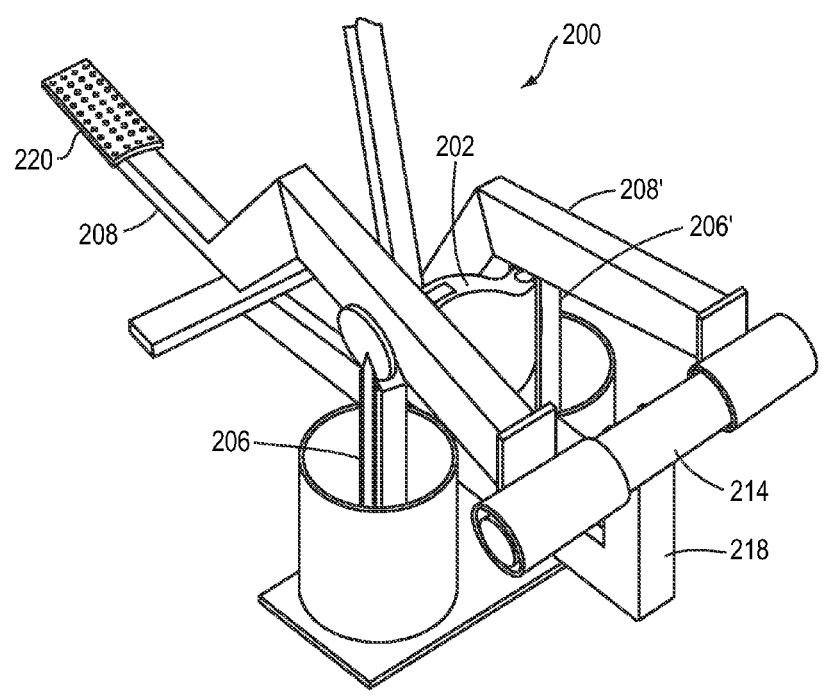
FIG. 3 is a schematic perspective view of a human-powered irrigation pump in accordance with one embodiment of the invention.
Figure 4A:
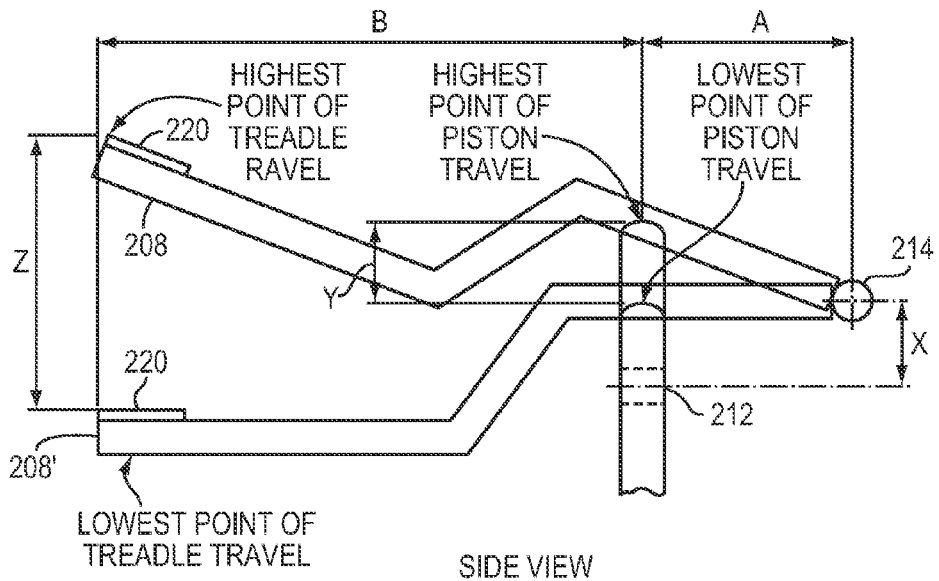
FIGS. 4A and 4B are schematic side and front views of a treadle, piston, rocker pivot, and treadle pivot in accordance with one embodiment of the invention.
Figure 4B:
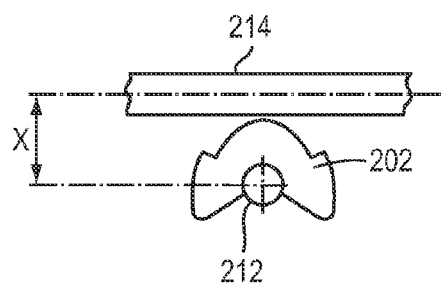
Figure 5:
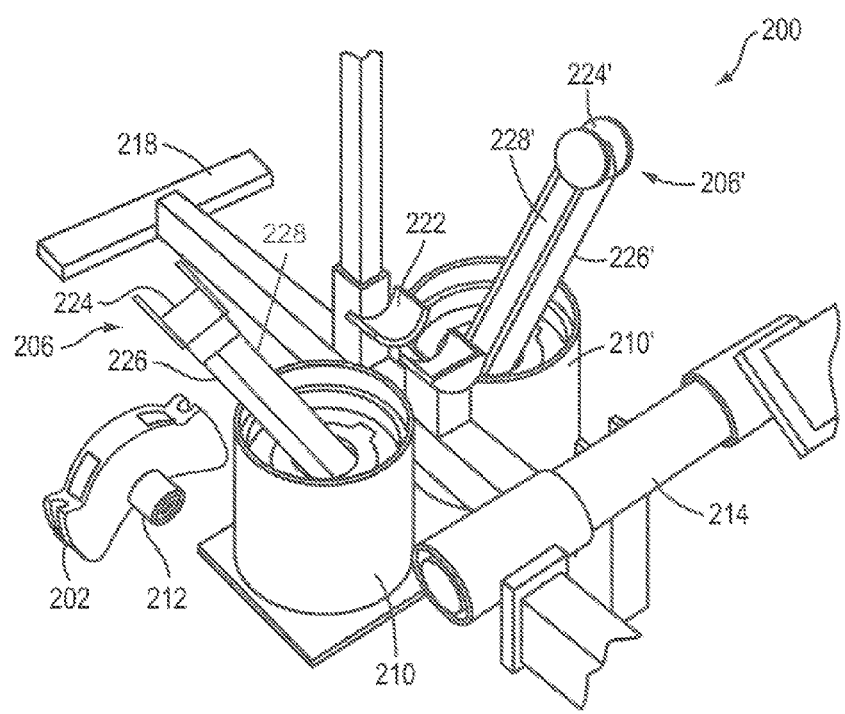
FIG. 5 is a schematic top perspective view of a partially assembled human-powered irrigation pump of FIG. 3, without the treadles.

FIGS. 3-5 depict an embodiment of the present invention directed to a lighter, stiffer, easier to repair, and lower-cost human-powered treadle pump 200 relative to the prior art pumps 100a, 100b, in which a reciprocating rocker 202 is supported by a rocker pivot 212 disposed between treadles 208, 208' and mounted below a treadle pivot 214 that provides a pivotable connection for the treadles 208, 208'. Each treadle 208, 208' may be directly linked to and mounted on a piston 206, 206'. A tensile member 204 may be used to connect the reciprocating rocker 202 to one piston 206, and another tensile member 204' may be used to connect the reciprocating rocker 202 to another piston 206' (see FIG. 8B). Each end of the tensile members 204, 204' may terminate in metal nipples or metal sleeves 216 (see FIG. 7) to help maintain a constant length and allow the tensile members 204, 204' to be secured within grooves or other receptacles in the pistons 206, 206' and the reciprocating rocker 202. Downward movement of the treadle 208 may push down the corresponding piston 206, causing the tensile member 204 to pull down one side of the reciprocating rocker 202 and forcing it to rotate about the rocker pivot 212. This in turn may pull up the other piston 206' on the other side of the reciprocating rocker 202 by means of the other tensile member 204'. This arrangement offers significant benefits in terms of manufacturability, maintainability, and operational reliability, as discussed further below.

As shown in FIGS. 4A and 4B, the reciprocating rocker 202 rotates about the rocker pivot 212, which may be mounted at a lower elevation than the treadle pivot 214 (i.e., the axis about which the treadles 208, 208' rotate), while providing effective transfer of forces and coordination of treadle movement. The frame 218 may include a mount 222 for the rocker pivot 212 lower than the treadle pivot 214 (see FIG. 5). By mounting the rocker 202 at a lower level and on simple supports on the frame 218, the pump 200 can achieve a greater stiffness, reduced weight, and lower cost by using less material than prior art treadle pumps 100a, 100b. The vertical offset distance is represented in FIGS. 4A and 4B as a dimension "X," typically measured in inches or centimeters. In the depicted embodiment, the rocker pivot 212 and the treadle pivot 214 are also offset by a horizontal distance, represented in the figures as a dimension "A" and typically measured in similar units. The rocker pivot is also horizontally offset from a distal end of the treadles 208, 208', represented in the figures as a dimension "B" and again typically measured in similar units.

A foot plate 220 may be connected to the distal end of each of the treadles 208, 208'. The foot plate 220 may provide a friction surface to allow operation while minimizing the risk of slippage. This can be accomplished through many means, including raising portions of the surface or by providing a textured surface (e.g., rippled edges).

Figure 6:
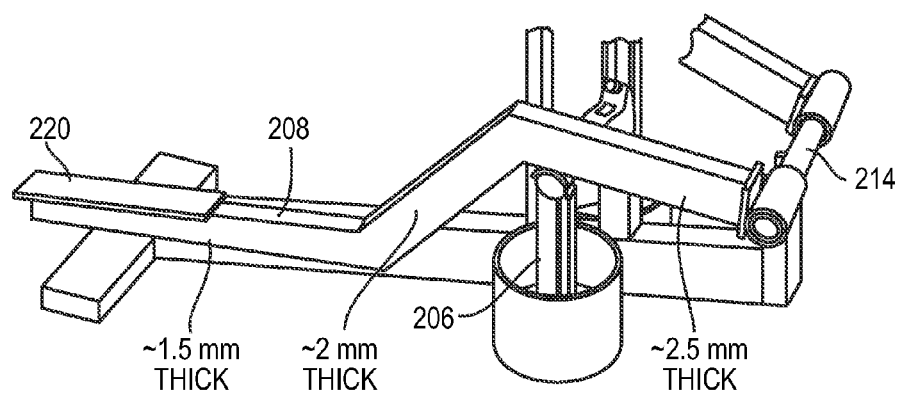
FIG. 6 is a schematic perspective view of a treadle in accordance with one embodiment of the invention.

In some embodiments, shown in FIG. 6, the wall thickness of the treadles 208, 208' can vary along the length of the treadle 208, 208', being thicker at the pivot end and thinner at the foot plate end. This design helps to minimize weight while optimizing strength by increasing the wall thickness of the treadles 208, 208' at points where maximum stress is expected (i.e., from the treadle pivot 214 to over the pistons 206, 206'), and reducing the wall thickness at points further away from the expected high stress areas (i.e., proximate the foot plates 220). The treadles 208, 208' may be manufactured as welded box beams.

The treadles 208, 208' may rest in cradles 224, 224' at the tops of the pistons 206, 206' and are capable of reacting to input forces from a variety of sources. In one embodiment, the bottom of the cradles 224, 224' may be substantially triangular (or any other geometrical shape) to accept a similarly shaped portion of the treadles 208, 208' and can have circular shaped sidewalls (or any other geometrical shape) to prevent the treadles 208, 208' from slipping off the piston 206, 206'. For example, the treadles 208, 208' may be actuated by a human stepping motion. The treadles 208, 208' can also be forced upward by the movement of the pistons 206, 206'.

In one embodiment, each piston 206, 206' may include a connecting rod 226, 226' which forms a channel 228, 228' along its longitudinal axis. Each channel 228, 228' can be of sufficient width so that an arcuate edge of the rocker 202 may fit within the channel. In operation, each edge of the rocker 202 may contact an inner wall of each channel 228, 228'. This interaction may be as small as a single point of contact or as large as an entire surface of the rocker 202. As the system operates as described above, the rocker edge may rotate along with the vertical travel of each piston 206, 206' to guide the piston 206, 206', e.g., in a substantially straight vertical path. Ensuring a vertical path reduces energy losses in the system due to additional friction and bending forces which can result from a misaligned piston. Reducing these energy losses can help maintain the efficiency of the pump assembly 200 and prolong the life of the piston components 206, 206'.

Figure 7:
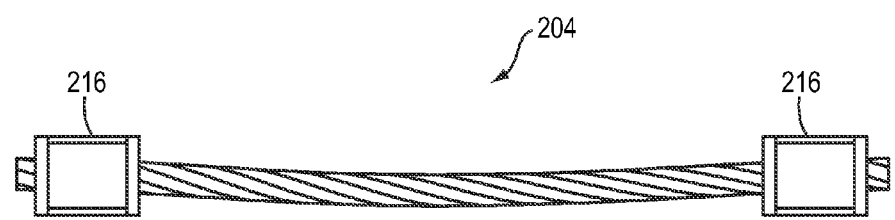
FIG. 7 is a schematic plan view of a flexible steel cable component in accordance with one embodiment of the invention.

In various embodiments of the tensile members 204, 204', which form the connection between the reciprocating rocker 202 and the pistons 206, 206', the tensile members are flexible steel cables (e.g., wire rope), as seen in FIG. 7. Using this material, or other similar materials, helps avoid undesirable characteristics of using chains or ropes for performing a similar power transmission function in other pumps. Chains tend to wear at the contact points between links, which leads to lengthening of the chain, and consequently allows the treadles 208, 208' to drop in relation to the foot section of the frame 220. This can result in a reduction in the stroke of the pistons 206, 206', and thus the amount of water pumped. Rope may be more easily adjusted than a chain, but adjustments are frequently needed because rope tends to stretch. Being forced to adjust the rope frequently is a clear inconvenience to the user. Further, rope wears over time and can break more easily than some other materials. The flexible steel cable used in some embodiments may be terminated in metal nipples 216 (e.g., copper swagings) to resist stretching and to prevent the need for frequent adjustments. The terminations may be precisely spaced and the cables may be quickly replaced (e.g., in less than a minute for some embodiments) after a much longer useful life.

Figure 8A:
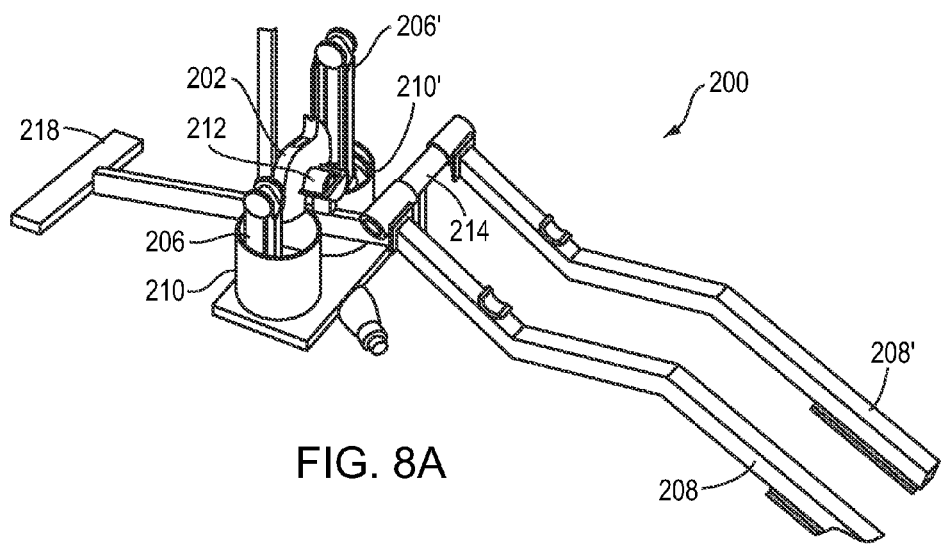
FIGS. 8A-8E depict a procedure for disassembling a human-powered irrigation pump in accordance with one embodiment of the invention.
Figure 8B:
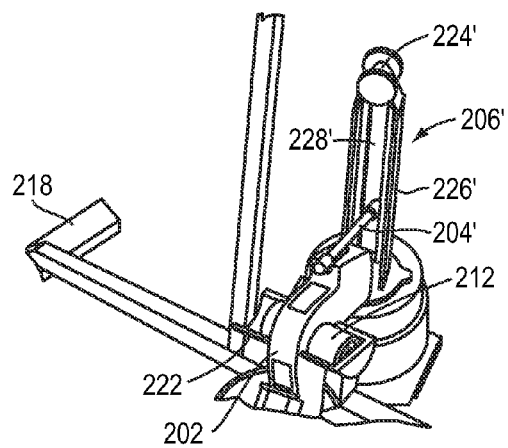
Figure 8C:
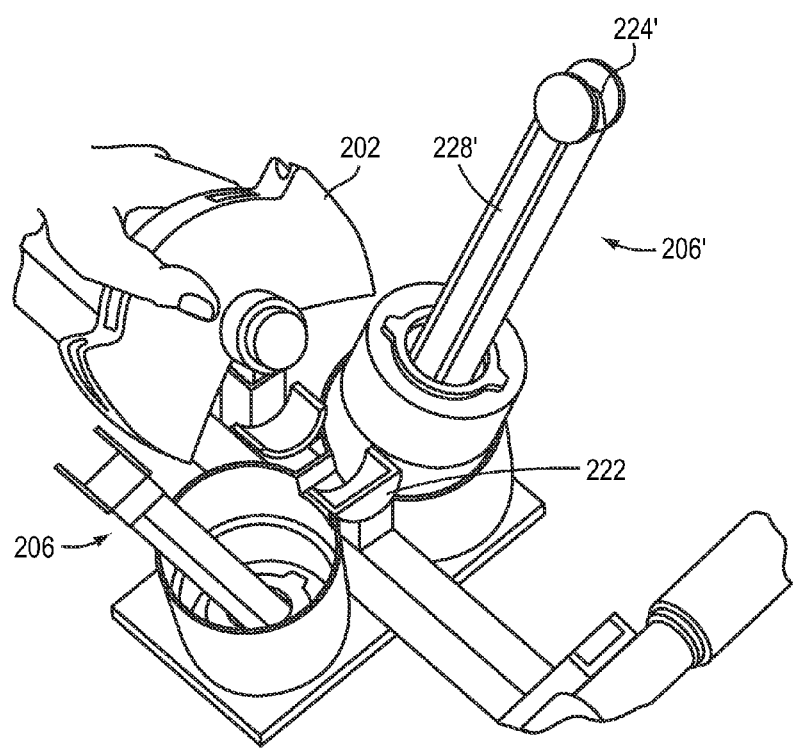
Figure 8D:
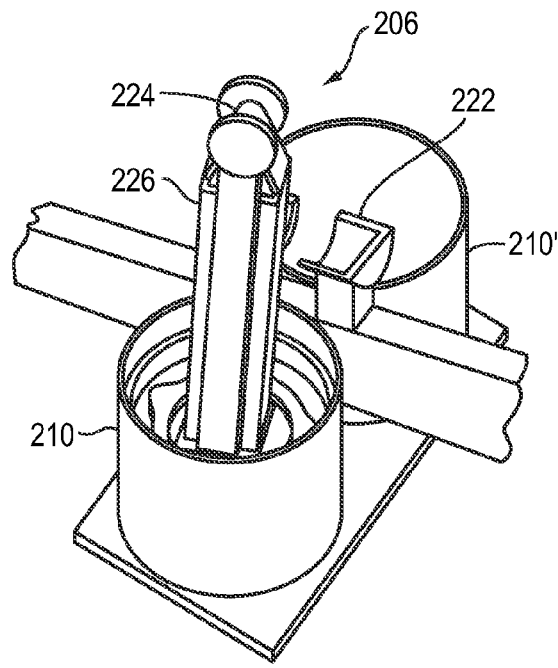
Figure 8E:
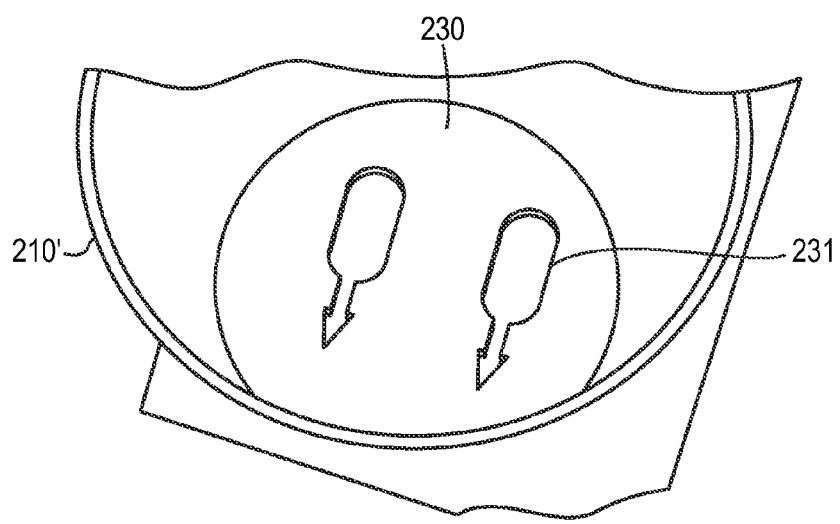

Disassembly of the pump 200, such as for cleaning or maintenance, is also made easier in this arrangement, and is depicted in FIGS. 8A-8E. The treadles 208, 208' may be rotatably coupled to the treadle pivot 214 on the frame of the pump 218, such that the treadles 208, 208' may be decoupled from the pistons 206, 206' by simply lifting them upwards and rotating them upwards about the treadle pivot 214, out of the piston cradles 224, 224', and resting them on the ground in front of the pump 200 (FIG. 8A). The treadles 208, 208' do not need to be removed from the pump 200. The reciprocating rocker 202 may then be accessible from above and, therefore, can be removed by simply lifting and tugging each tensile member 204, 204' from its mount (FIG. 8B), then taking the reciprocating rocker 202 off its mounting 222 (FIG. 8C). Thereafter, the pistons 206, 206' may be lifted vertically without restriction (FIG. 8D). Each piston 206, 206' may be dealt with separately for inspection and refurbishment, as necessary. For example, an upper piston cup may be removed from its retainer and lifted up around the connecting rod 226, 226'. Finally, a valve plate 230 located at the bottom of the cylinder 210, 210' is revealed and may be readily accessed for valve 232 removal (FIG. 8E).

Figure 9:
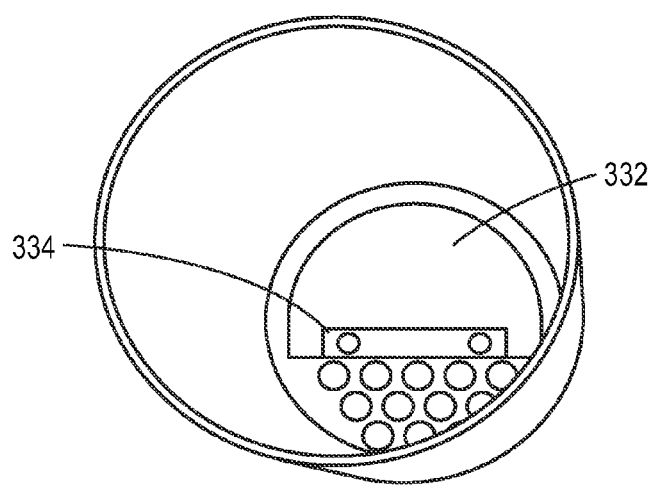
FIG. 9 is a schematic top perspective view of a prior art valve mounting configuration.

In prior art pumps, flapper valves 332 are typically held in a fixed location by some kind of structure, such as a bar support and associated rivets 334, as seen in FIG. 9. This configuration entails extra cost over simpler configurations, both in terms of additional components and labor during manufacture. Repair may also be difficult, sometimes requiring that the rivets be drilled out and new rivets installed to secure a replacement valve. Further, if this valve support is imperfectly positioned or becomes unadjusted in use, the pump may operate at a much lower efficiency, or not at all. The bar support could end up in the wrong position or displace the valve 332 for a variety of reasons, including corrosion of the structure. Additionally, some prior art valve mounts with additional support structure may require several steps to insert a valve, and may require more open space than is provided for in a cylinder mounted on a pump frame. Other prior art treadle pumps have a valve box located below a cylinder that must be split and attached with bolts, to permit access to the outlet valve (i.e., located below the valve plate). This frequently also requires disengaging the cylinders from the frame.

Figure 10:
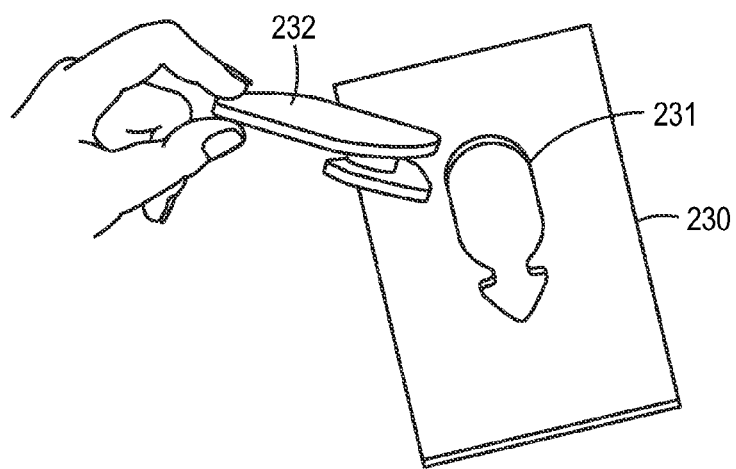
FIG. 10 is a schematic top perspective view of a shaped aperture in a valve plate and a corresponding valve in accordance with one embodiment of the invention.
Figure 11A:
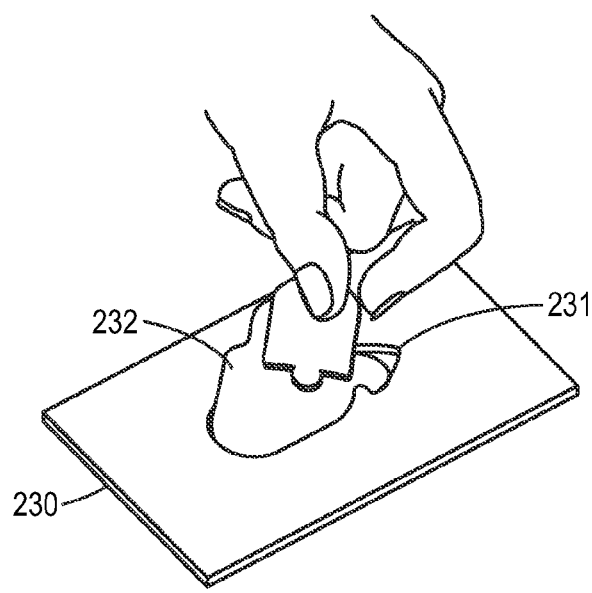
FIGS. 11A and 11B depict a procedure for installing a valve in a valve plate in accordance with one embodiment of the invention.
Figure 11B:
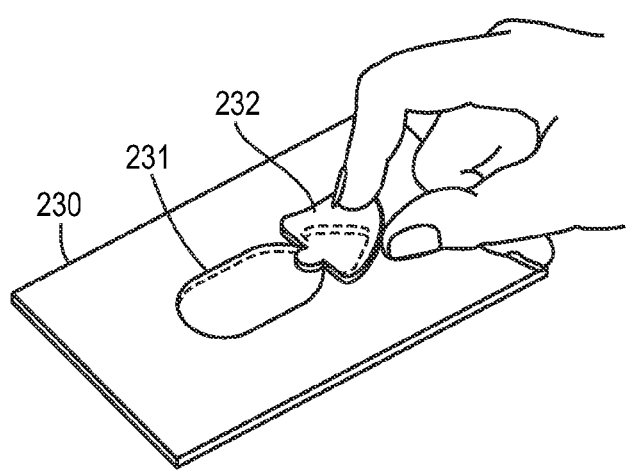

In an embodiment of the present invention, as seen in FIG. 10, the valves 232 require no structural support beyond an aperture 231 formed in the valve plate 230 to secure the valves 232 in place. FIGS. 11A and 11B depict how the valves 232 may be positioned in the shaped portion of the aperture 231. The shape of the valve 232 may form a substantially complementary shape to the aperture 231. In an additional or alternative embodiment, depicted for example in FIG. 8E or FIG. 10, the aperture is not symmetrical about two planar axes (e.g., not uniformly shaped along its length). For example, the edges of the aperture in the valve plate 230 may be closer to each other in a narrower portion and further away at points immediately to either side of the narrower portion. The narrower portion of the aperture may receive and secure the valve 232 to the valve plate 230.

To secure the valve 232 to the valve plate 230, the valve 232 may be held in the shaped aperture 231 such that portions of the valve 232 are on either side of the valve plate 230. The valve 232 may be slid or moved toward an edge of the shaped aperture 231, such as the narrower portion, which is shaped to accept a corresponding part of the valve 232, so as to retain the valve 232 in a stable position on the valve plate 230. This fit may be achieved, for example, by mating complementary shapes or by forcing a larger structure into or through a smaller space to achieve a snap-fit connection or friction fit. Once the valve 232 is secured to the valve plate 230, the shape of the valve 232 should cover the entire aperture 231 or substantially the entire aperture 231. This configuration, as well as other contemplated configurations, can reduce manufacturing costs and incidences of imperfect positioning when compared with other valve configurations that require additional supporting structure.

Figure 12:
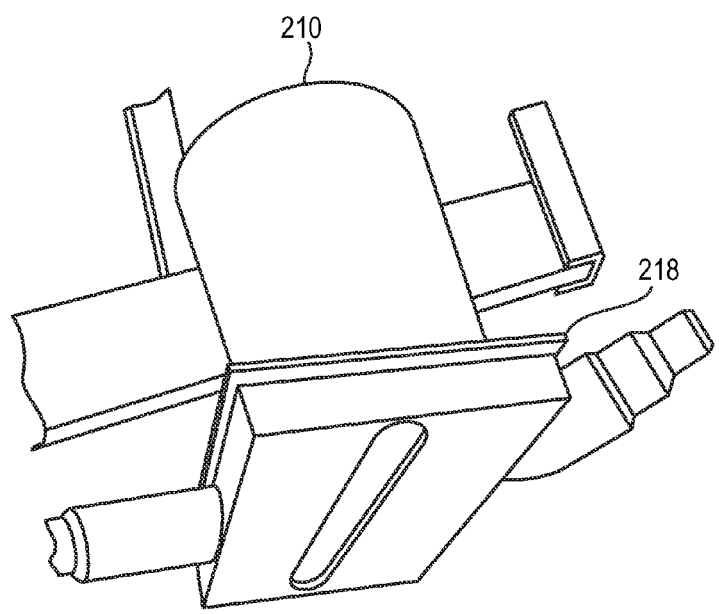
FIG. 12 is a schematic bottom perspective view of a cylinder welded to a frame in accordance with one embodiment of the invention.

In some embodiments of the invention, the valves 232 can be installed by accessing only one side of the valve plate. For example, both of the inlet and outlet valves 232 may be installed while the cylinder 210, 210' is mounted on the frame 218. This allows the cylinders 210, 210' to be welded to the frame 218 in another preferred embodiment, as seen in FIG. 12, reducing the risk of leaks through an unsecured seal between the cylinders and the frame.

Figure 13:
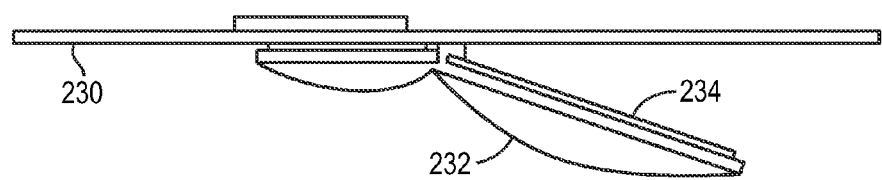
FIG. 13 is a schematic side view of one embodiment of a valve mounted on the underside of a valve plate.

Once installed, the valves 232 for the outlets hang below the valve plates 230, as depicted in FIG. 13. Over time, the sealing part 234 of the valve 232 may sag, and, in certain circumstances, may become permanently deformed and remain in a position similar as that depicted in FIG. 13. This deformation reduces the sealing effectiveness over the aperture 231 and reduces the efficiency of the pump 200, because a greater force would be required to close the valve 232.

Figure 14A:
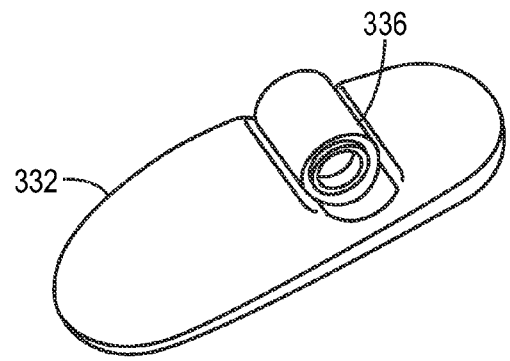
FIGS. 14A and 14B are schematic top perspective views of valves in accordance with other embodiments of the invention.
Figure 14B:
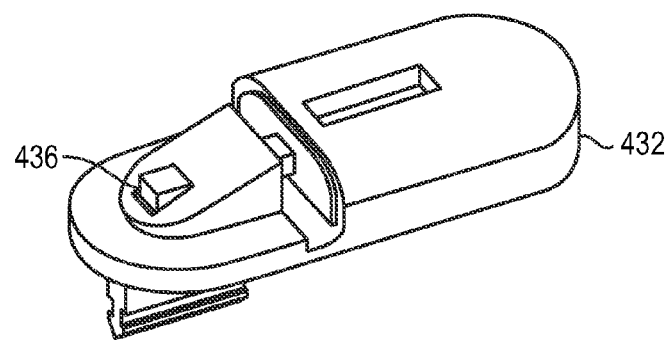

FIGS. 14A and 14B depict alternative embodiments of the valve of the present invention, including those with additional replaceable parts made of rubber or other materials to form a compound seal. Rubber typically does not suffer creep as much as polyvinyl chloride (PVC) or other plasticized vinyl or cellulosic plastics. These added parts may provide slightly greater resistance to valve opening and may help eliminate valve sag or droop. One embodiment includes a rubber hose section 336 mounted transversely, parallel to the axis of the hinge of a valve 332, as seen in FIG. 14A. In this configuration, the rubber hose 336 may be compressed radially when the valve 332 is opening, providing a biasing force urging the valve 332 to close. In an alternative embodiment, the aperture into which the section of the rubber hose 336 is inserted is ovoid, so that the section of the rubber hose 336 is already slightly radially compressed, thereby providing a pre-loaded spring-like force urging the valve 332 to seal against the valve plate. In another embodiment, the additional part is a rubber strip 436 mounted longitudinally along a valve 432 and across the hinge, as seen in FIG. 14B. The strip 436 is bent when the valve 432 is opening, thereby providing a spring-like force urging the valve 432 to close. In a further embodiment, the shape of the hole into which the rubber strip 436 is inserted is bowed, so as to pre-load the rubber strip 436 and urge the valve 432 to fit snugly against the valve plate. The added parts may be made of a variety of different materials, in different thicknesses, configurations, and profiles, to control the loading and pre-loading forces on the valves.

Figure 15:
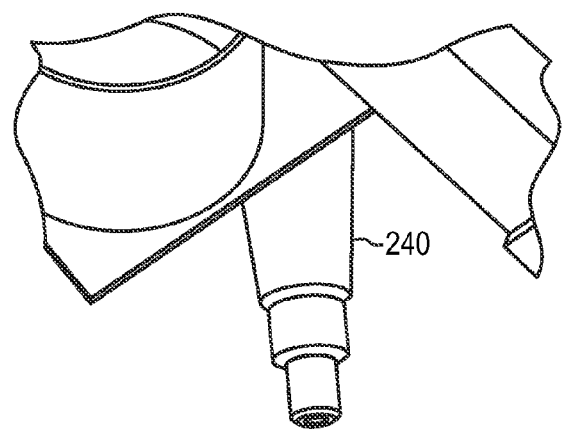
FIG. 15 is a schematic top perspective view of a spigot with a stepped diameter in accordance with one embodiment of the invention.

As seen in FIG. 15, an embodiment of the current invention also includes a spigot 240 with stepped diameters which extends from a valve box to form connections with an inlet or an outlet hose. The stepped diameters enable the pump 200 to be connected to a variety of different available hoses of various inner diameters in the locality of use.

Figure 16:
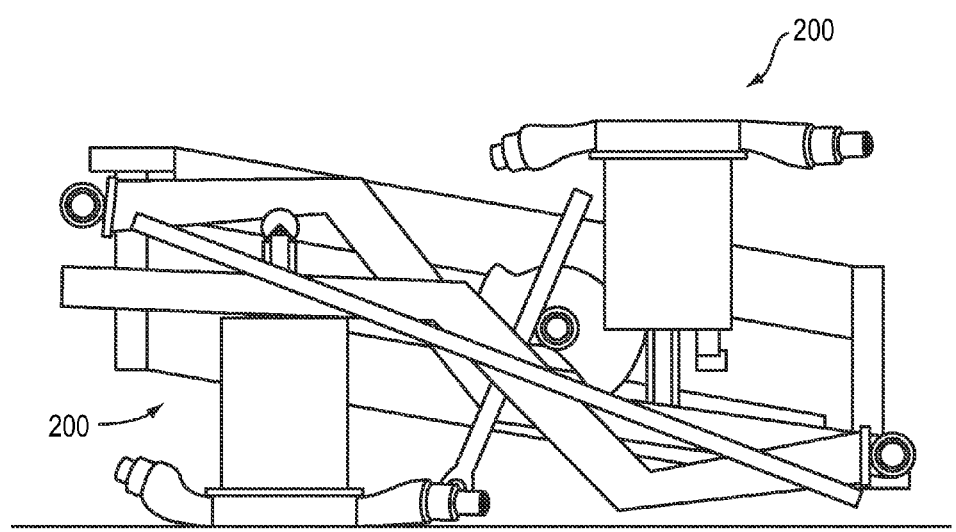
FIG. 16 is a schematic side view of a nested pair of human-powered irrigation pumps configured for compact shipping in accordance with one embodiment of the invention.

Another problem with prior art treadle pumps is that they are an awkward shape and when packed into a container for trans-national shipment, the maximum quantity is very limited. The present invention is designed to maximize the number of units that could be shipped in a container at once. In one embodiment, the pumps are nestable within each other, as seen in FIG. 16, allowing almost twice as many pumps to be loaded in the same volume in the container as compared to some prior art configurations, leading to considerably reduced shipping costs.

EXAMPLE

Exemplary materials and dimensions for an embodiment of the human-powered irrigation pump are discussed herein below. The invention is not intended to be limited to these properties and they are used only to illustrate one such embodiment. In one embodiment, the rocker pivot and treadle pivot are horizontally offset by about 20 cm (dimension A in FIG. 4A) and vertically offset by about 6 cm (dimension X in FIGS. 4A and 4B). The piston may travel about 7 cm (dimension Y in FIG. 4A) from its lowest point to its highest point and the end of each treadle proximate the foot plate may travel about 25 cm from its lowest point to its highest point (dimension Z in FIG. 4A). FIG. 4A is just one representation of the range of travel. For example, the lowest point of treadle travel may be well below horizontal. The horizontal distance between the end of the treadle proximate the foot plate and the center of the rocker pivot is about 60 cm. This configuration provides an approximately 4:1 mechanical advantage. In one embodiment of the pump assembly, when the pumps are nested as in FIG. 16, the dimensions of the area occupied by the pumps are approximately 80 cm×40 cm×30 cm.

Further embodiments of the pump assembly may consist of components of different dimensions. The rocker pivot 212 and treadle pivot 214 may be horizontally offset by as little as 2 cm and up to distances of 200 cm and greater. The rocker pivot 212 and treadle pivot 214 may be vertically offset by as little as 0 cm and up to distances of 50 cm and greater. The piston 206, 206' may travel as little as 0.5 cm and up to lengths of 50 cm and greater. The treadles 208, 208' may travel as little as 5 cm and up to lengths of 100 cm and greater. The pump 200 may be configured to achieve a mechanical advantage ranging from less than 1:1 to 10:1 and greater.

Portions of the pump assembly which are not designed to come into contact with the liquid being pumped can be made of a suitable steel and welded for strength and reliability. Those portions of the pump assembly which are intended to contact the liquid being pumped can be made of a hardened, stainless or galvanized steel, or otherwise treated to resist corrosion. For example, the pump 200 may be built with stainless steel valve plates 230 and piston disks while valves 232 and piston cups may be made from flexible plastics or rubbers. Therefore, the main sealing surfaces which mate with flexible plastic and/or rubber components (i.e., the valves 232 and piston cups) should not corrode and sealing should remain impervious to corrosion throughout the life of the pump 200. Each of the valve plates 230 may be a flat plate with shaped apertures 231 (e.g., oblong- or ovoid-shaped holes). The valves 232 and piston cup may be made of any suitable resilient compliant material, such as polyolefins, natural or synthetic rubbers, or combinations thereof, such as thermoplastic elastomers (TPE). Other components of the pump assembly 200 may be made of the materials discussed herein as well as any other suitable materials for a pumping application. For example, if being lightweight is important, portions of the pump assembly 200 may be manufactured from aluminum, high-strength plastics, fiber-reinforced resin composites, etc.

In some embodiment, the frame 218 may be made of mild steel. The treadles 208, 208' may be made of mild steel or aluminum castings. The rocker 202 may be made of fabricated or pressed mild steel sheet. The valves 232 may be made of plasticized PVC. The piston rod 226, 226' and the piston cup retainers may be made of pressed mild steel, and the piston disc may be blanked from stainless steel. The tensile members 204, 204' may be made of stainless steel wire rope. The treadle pivot 214 may be made of pressed or formed mild steel. The cylinders 210, 210' may be made of mild steel. The valve plates 230 may be made of stainless steel. The footplates 220 may be made of mild steel.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive. Furthermore, the configurations described herein are intended as illustrative and in no way limiting. Similarly, although physical explanations have been provided for explanatory purposes, there is no intent to be bound by any particular theory or mechanism, or to limit the claims in accordance therewith.

We claim:

1. A human-powered pump assembly comprising:
   a frame;
   a treadle pivot attached to the frame, the treadle pivot defining a fixed horizontal rotational axis;
   a pair of treadles coupled to the treadle pivot;
   a rocker pivot attached to the frame, the rocker pivot defining a separate horizontal rotational axis;
   a pair of cylinders coupled to the frame;
   a piston disposed in each of the cylinders, each piston comprising a connecting rod forming a channel along a longitudinal axis of the connecting rod; and
   a reciprocating rocker coupled to the rocker pivot and to the pair of treadles to constrain the motion thereof, wherein the rocker pivot axis is located below the treadle pivot axis throughout a full range of motion of the assembly.

2. The pump assembly of claim 1, wherein the rocker pivot is supported by the frame on two sides of the reciprocating rocker.

3. The pump assembly of claim 1, wherein the cylinders are welded to the frame.

4. The pump assembly of claim 1, wherein each channel is configured to receive an edge of the reciprocating rocker to guide movement of an associated piston.

5. The pump assembly of claim 4, wherein each edge of the reciprocating rocker and an associated channel are configured for rolling contact to maintain piston alignment in an associated cylinder.

6. The pump assembly of claim 1, wherein the pistons are connected by tensile members to the reciprocating rocker.

7. The pump assembly of claim 6, wherein the tensile members are located between the pair of treadles.

8. The pump assembly of claim 6, wherein each of the tensile members is a flexible steel cable.

9. The pump assembly of claim 1 further comprising a pair of valves disposed within each cylinder.

10. The pump assembly of claim 9 further comprising a valve plate connected to each cylinder.

11. The pump assembly of claim 10, wherein each valve plate forms a pair of shaped apertures.

12. The pump assembly of claim 11, wherein the pair of valves are adapted to seal the pair of shaped apertures and are configured to be installed in the valve plate via access to solely one side of the valve plate.

13. The pump assembly of claim 12, wherein the shaped aperture comprises a substantially triangular portion.

14. The pump assembly of claim 9, wherein each valve comprises a compound seal with a replaceable hinge reinforcement element adapted to modify an opening force of the valve and to bias the valve into sealing engagement with a valve plate.

15. The pump assembly of claim 14, wherein the replaceable hinge reinforcement element comprises an elongate element.

16. The pump assembly of claim 14, wherein the replaceable hinge reinforcement element comprises a tubular element.

17. A method of operating a human-powered pump assembly, the method comprising the steps of:
   applying a downward force to a first treadle to rotate the first treadle about a horizontally fixed treadle pivot axis in a downward direction, thereby pushing down a first piston within a first cylinder coupled to a frame, the first treadle coupled to a second treadle by a reciprocating rocker rotating about a rocker pivot axis located below the treadle pivot axis throughout a full range of motion of the assembly, such that the second treadle rotates in an upward direction, thereby pulling up a second piston within a second cylinder coupled to the frame; and
   applying a downward force to the second treadle to rotate the second treadle about the treadle pivot axis in a downward direction, such that the first treadle rotates in an upward direction, whereby the first and second pistons move in the direction of the first and second treadles, respectively,
   wherein each piston comprises a connecting rod forming a channel along a longitudinal axis of the connecting rod.

18. The method of claim 17, wherein the first piston transfers a downward force through a first tensile member to the reciprocating rocker, causing the reciprocating rocker to rotate about the rocker pivot axis.

19. The method of claim 17, wherein each treadle is received in a cradle in a corresponding piston and is raised by upward movement of the corresponding piston.

* * * * *